United States Patent [19]
Marx et al.

[11] 3,727,412
[45] Apr. 17, 1973

[54] PROCESS FOR THE IN SITU SEALING OF SOIL SURROUNDING UNDERGROUND CONDUIT BREAKS

[75] Inventors: John W. Marx; Jr. Bowman, both of Bartlesville, Okla.

[73] Assignee: Phillips Petroleum Company, Bartlesville, Okla.

[22] Filed: Aug. 16, 1971

[21] Appl. No.: 172,279

[52] U.S. Cl. .................. 61/36 R, 138/97, 166/294
[51] Int. Cl. .................................................. E02d 3/12
[58] Field of Search .................. 61/36 R; 138/97; 166/294

[56] References Cited

UNITED STATES PATENTS

| | | | |
|---|---|---|---|
| 2,121,036 | 6/1938 | Irons | 61/36 X |
| 3,145,773 | 8/1964 | Jorda et al. | 166/294 X |
| 3,227,572 | 1/1966 | Rundle et al. | 61/36 X |
| 3,312,296 | 4/1967 | Paramore et al. | 166/294 X |
| 3,443,640 | 5/1969 | Klein | 166/294 |

*Primary Examiner*—David J. Williamowsky
*Assistant Examiner*—David H. Corbin
*Attorney*—J. Arthur Young et al.

[57] ABSTRACT

A process for sealing soil adjacent to underground conduit breaks through the use of surfactant-stabilized latex emulsion wherein the sealing phenomena can be made to occur at varying penetration depths therein forming a seal against fluid flow.

14 Claims, No Drawings

PROCESS FOR THE IN SITU SEALING OF SOIL SURROUNDING UNDERGROUND CONDUIT BREAKS

This invention relates to a process for the in situ sealing of soil adjacent to underground conduit breaks. In a more particular aspect, this invention relates to the in situ sealing of soil surrounding underground conduit breaks through the injection therein a surfactant-stabilized emulsions. In yet another aspect, this invention is directed to a process for reducing the permeability of soil to fluid flow. This invention has particular applications where it is desirable to stop the passage of fluid flow through the walls of an underground conduit or the soil adjacent thereto.

Repairing cracks and leaks in underground conduits whether they be for water, sewage, general fluid transportation, or utilities, is an expensive and time-consuming operation. It is the usual procedure to remove the soil, rocks, or other materials surrounding the leaking conduit and patch the cracks, if possible, or remove the cracked or damaged conduit section completely. Other repair procedures have included applying leak clamps to defective joints and split sleeves to straight sections, or surrounding the defective section with concrete or similar materials.

Repairs to a defective system have also been made by applying a concrete lining to the inner surface of the conduits. This method, although effective, requires special equipment and reduces the capacity of the system. Another method of temporarily reducing leakage which has been proposed in utility conduits is the application of a waxy solution which swells the packing materials in joints and other problem areas.

Leaks in conduits which transmit anhydrous fluids, such as natural gas, have also been found particularly difficult to reduce for any substantial length of time. Materials used to stop the leakage have tended to dry out and crack, thus preventing repairs of any permanence. Also, weather conditions such as freezing or thawing affect most sealants.

The aforementioned methods for repairing underground conduit leaks have been aimed at both the reduction of fluid flow from the conduit as well as fluid flow into the conduit. Heavy rainfall, for example, can invade the underground conduit systems mainly through faulty joints and cracks, producing unwanted problems such as electrical shorting, conduit fluid contamination as well as overloading of conduit capacities. These same breaks also permit escape of conduit fluid in dry weather.

A commonplace and troublesome underground conduit application is in the transportation of sewage water which can escape into the surrounding soil to create sanitation problems. On the other hand, if the pressure of the water in the soil surrounding the sewer pipe is sufficiently great, the water moves into the sewer conduit. In the latter case, the excess amount of water in the sewer conduit overburdens the facilities of sewage disposal plants, making it extremely difficult to process the sewage properly. Although the above emphasizes the use of the process described herein primarily for the repair of leaking conduits used to transport sewage, the process is not so limited. The described process is applicable to the repair of leaks in any ceramic, concrete, metal, and the like conduits which carry fluids, utility cables, phone cables, and the like.

It is an object of this invention to provide an in situ process for sealing the adjacent soil around an underground conduit break thereby inhibiting fluid flow therefrom. It is another object of this invention to provide a process for sealing the soil adjacent to underground conduit breaks thereby preventing infiltration of exterior fluids.

In accordance with this invention there is provided a process for sealing the soil adjacent to underground conduit breaks to prevent infiltration of exterior fluids or escape of conduit fluids. A portion of underground conduit upstream and downstream from the break is blocked off and flushed. A surfactant-stabilized latex or asphalt emulsion is then injected into the blocked off portion under pressurized conditions. The amount of surfactant utilized is adjusted to a threshold value before injection of emulsion material into the conduit and preventing coagulation in the conduit itself. The surfactant-stabilized emulsion is maintained under pressurized conditions within the conduit portion from 15 minutes to 24 hours depending upon the insight to conditions. Normally the emulsion is maintained in the conduit until further sealant addition is found to be unnecessary. Multiple sealant treatment steps can be achieved when required by insitu conditions.

Surfactant-stabilized particle dispersions are also suitable means for the process of our invention. The insight to sealing of soil adjacent the underground conduit breaks may be accomplished by using, for example, carbon black dispersions, asphalt emulsions, colloidal sulfur, and the like. Commercial dispersions of asphalt and water are normally made for highway treatment using either anionic or cationic surfactant stabilizers. These are designated in highway specifications as SS (slow setting) and FS (fast setting) emulsions, respectively. Both types usually have average particle diameter of less than 5 microns, but they also contain terminal particles of from 30 to about 50 microns in diameter, therefore being too large to penetrate most porous soil media.

The surfactant-stabilized emulsions of this invention, upon entering the surrounding soil adjacent to the underground conduit break, coagulate under controlled conditions ranging from about 0.1 inch to several feet. The aforementioned coagulation is the result of the surfactant being adsorbed onto the internal soil surfaces therein upsetting the surfactant coagulation balance. By proper adjustment of the surfactant balance, the sealing phenomena of this invention can be freely adjusted as to depth, soil type, and fluid flow problems.

A threshold stability emulsion is herein defined for the purposes of this invention as being one having sufficient surfactant stabilization agent therein to maintain the emulsion without coagulation occurring. Such a threshold stabilized emulsion is easily coagulated by the removal of a small portion of the included surfactant stabilizing agents. For example, when a surfactant-stabilized emulsion invades a porous medium, the leading edge of the invasion front is progressively destabilized by adsorption or chemisorption of surfactant on the internal mineral or soil surfaces. The destabilized primary particles (1) may combine with each other to form larger aggregates, i.e., secondary particles, and/or (2) they may be deposited as an adherent layer on the mineral surface. In either case, the precipitated particles reduce the permeability of the porous matrix, and those particles which adhere strongly to the mineral surface also serve as a binder for unconsolidated media.

In order to apply this process at its greatest efficiency, it is essential that the particles be small enough to essentially penetrate the pore openings in the adjacent soil. This permits sealing in controlled depths. Large particles would simply be filtered out at the soil surface and subsequently backflowed into the line by invading exterior fluids. Once deposited, the emulsion particles of this invention are not redispersed by subsequent exterior flooding. For the purposes of this invention, the physical interactions between surfactant-stabilized emulsions and the porous media are governed by factors listed below:

1. primary particle size relative to pore size;
2. surfactant type;
3. surfactant concentration;
4. particle solids concentration; and
5. types of particle emulsions The particle size criterion is determined by the terminal (largest) particles. If the terminal particles approach or exceed the size of the largest pores in the porous medium, the particles will be filtered out mechanically at the entry face, with little or no penetration to the porous matrix. It is the terminal particle size, not the average or median size, that determines whether the particle system can penetrate a given porous medium. For sealing soil adjacent to conduit breaks, it is desirable to keep the maximum primary particle size within the limits as given in Table I hereinbelow, in order to secure deep penetration at low pressure gradients.

TABLE I

| Porous Medium | Preferred Sealant Particle Size Range |
|---|---|
| Clay, fine dust | Up to 0.5 micron |
| Silt, very fine sand | Up to 1 micron |
| Fine sand | Up to 3 microns |
| Medium sand | Up to 5 microns |
| Coarse sand | Up to 10 microns |
| Very coarse sand, fine gravel | Up to 30 microns |

It should be noted that any emulsion can contain a few outside "freaks", secondary aggregates, extraneous debris, microbubbles, and the like. Normally these isolated exceptions constitute a negligible fraction of the overall particle solids volume and are not regarded as characteristic terminal particles.

Stabilizing surfactants fall into three broad categories: (1) nonionic, (2) anionic, and (3) cationic. Although there are wide differences in surfactant behavior within each grouping, the chemical reactivity is similar for all members of any one category. In general, the nonionic surfactants do not react chemically with soil minerals; therefore their soil reaction is one of physical adsorption rather than chemisorption. For this reason, nonionic surfactants are preferred for treating finely divided soil particles, where deep penetration is desired and where the mineral compositions of the soil porous inner surfaces vary from point-to-point.

Anionic surfactants do not react chemically with clay or silica surfaces, but they do precipitate on contact with the calcium, magnesium, and iron ions found in most wet soils. Chemisorption of anionic stabilizers can be tolerated for sealing coarse sands or fine gravel fill adjacent to sewer line breaks, but they are undesirable for fine soil applications. Exemplary of suitable anionic surfactants suitable for the process of this invention are as follows: sodium lauryl sulfate, sodium stearant, sodium oleate, sodium linolenate, cetyl sulfate, and the like.

Cationic surfactants react with most silica and clay surfaces, and with most negative ions, found in many ground waters. The massive chemisorption results in limited penetration of the porous soil matrix regardless of the particle size of the dispersion. Cationic surfactants, therefore, are less desirable than anionic or nonionic surfactants as for the purposes of this invention.

Nonionic stabilizing surfactants are preferred for the purposes of this invention due to maximum penetration ability, but anionic and cationic surfactant stabilizers are not excluded from the scope of this invention. Suitable nonionic surfactants which are commercially available can be selected for example, from any of the nonbiodegradable nonionic surfactants found in McCutcheon's detergents and emulsifiers 1970 annual, published by the Allured Publishing Corporation, 45 North Broad Street, Richwood, N.J. 07450. Exemplary of the aforementioned nonionic surfactants suitable for the process of this invention are as follows.

nonylphenoxypoly(ethyleneoxy)ethanol,
octyl phenoxypoly(ethyleneoxy)ethanol,
alkyl aryl polyether alcohol, polyglycol ester,
fatty alkylol amide condensate, $RNH(CH_2CH_2O)_{15}H$,
ethoxylated alkenylamine, and the like.

Each specific particle-surfactant combination has a minimum (threshold) concentration of surfactant required to maintain bulk stability. If, for any reason, the surfactant content drops below this threshold value, the suspended particles will coagulate out of the bulk-carrier or water phase. The threshold surfactant requirement depends upon particle size, particle concentration, and the brine content of the water in the case of latex emulsions. Threshold values are best determined experimentally by noting the surfactant level at which a given particle dispersion begins to form films at the air-water or water-soil interfaces. This point is reached before coagulation occurs in the bulk solution away from such interfaces.

For equal throughput of the same particle content, the quantity of particle solids deposited per unit pore volume will depend upon two factors: (1) the surfactant present in excess of the threshold requirement; and (2) the specific surface area of the porous medium. Specific surface areas can vary from 100 square meters per gram for clays to less than one square meter per gram for coarse sand. Practical situations give rise to varied and specific surface values as they exist at the application site. Since these values cannot be controlled, the surfactant levels therein must be controlled and adjusted to prepare particle suspensions and dispersions which will penetrate virtually any matrix which has pores substantially larger than the terminal particle size. For example, in sealing coarse sands or other large-grain materials, which have low specific surface areas, one should operate at or close to the threshold surfactant levels with little or no excess surfactant present. For a given initial particle concentration, this will yield a relatively heavy deposit of particle solids per unit area of internal mineral surface. Heavy deposits can be tolerated in coarse sand applications, without completely suppressing penetration, because of the large pores available for flow. However, in fine-grained media, with large specific surface areas and smaller pores, heavy deposits are excessive and prevent any significant penetration.

As discussed hereinabove, the ultimate (equilibrium) quantity of particle solids deposited per unit pore volume depends primarily upon the ratio between stabilizing surfactants and suspended solids rather than upon their absolute concentrations. The same ultimate solids deposition, by using either a small volume of concentrated particle suspension or a large volume of dilute suspension as long as the surfactant to solid ratio were held constant, would be achieved. Practical considerations will require that particle solids content as applied normally be confined to a range between about 1 and 10 percent by weight and preferably limited to the range between about 2 and 6 percent by weight.

A preferred embodiment of the present invention is in the use of latex dispersions wherein the latex is a brine-coagulatable natural or synthetic material. Synthetic latexes are available through modern emulsion polymerization processes which yield aqueous dispersions, or latexes, of polystyrene, polybutadiene, styrene-butadiene copolymers, and many other polymeric elastomer latexes. Over the wide range of commercial latexes, average particle diameters vary from about 0.03 to about 1.0 microns and terminal (largest) particle diameters vary from about 0.1 to about 10 microns. For any one selected latex, the aforementioned range is much more narrow than those established hereinabove.

A commercially available latex dispersion, for example, could have excess surfactant which places dispersion beyond threshold values. This excess surfactant concentration can be manipulated through the addition of weak sodium chloride solutions in place of fresh water for dilution purposes. These weak brine solutions normally contain from about 1 to about 2 percent sodium chloride. The sodium chloride content raises the threshold surfactant requirement until it matches the requirements established by soil conditions.

Exemplary of the preferred brine-latex emulsions of this invention involve styrene/butadiene-rubber and butadiene/rubber latexes found in Table I below. Both examples as found in Table I below were used in testing the process of this invention which is further illustrated in Table II hereinbelow. The type identifications listed below in Table I are ASTM designations as recognized by the art.

Asphalt emulsions can be achieved using nonionic surfactants, with average particle diameters of about 2 microns and terminal particle diameters of about 6 microns. These special purpose asphalt emulsions can be utilized by the process of our invention for medium-to-course soil applications.

The method of our invention can be illustrated in various ways as will be seen from the following examples and tables. Examples I and II demonstrate the invention through the use of a buried, perforated pipe surrounded with unconsolidated soil. The results as shown in Table II were achieved through the application of a soil-filled vertical glass tube.

EXAMPLE I

A dispersion of 5,000 ppm (0.5 weight percent) of SBR 2101 latex solids in 50,000 ppm (5.0 weight percent) brine was stabilized with 1,000 ppm nonylphenoxypoly(ethyleneoxy)ethanol (Igepal CO-610) nonionic surfactant, while the pipe was buried in a container of unconsolidated sand, sealing solution was injected into a dead end, one-inch pipe which had 10 (⅛-inch) holes drilled through its sides. Prior to latex injection, water poured onto the sand invaded the pipe through the holes at a rate of about 150 milliliters per minute. After one latex injection the water influx was reduced to less than 0.5 milliliter per minute, a reduction of about 99.7 percent in invasion rate. The seal was distributed over a distance of about 4 inches from each hole.

TABLE I
Description of Types of Styrene/Butadiene-Rubber (SBR) and Butadiene/Rubber (BR) Latexes

| Type | Nominal temp., °F. | Activator | Short-stop | Catalyst | Emulsion | Nominal conv., percent | Contained polymer nom. Mooney visc., ML 1+4 (212° F.) | Nominal residual vol. unsaturate, percent | Nominal pH value | Percent coagulum on No. 80 sieve [1] | Nominal bound styrene | Nominal total solids |
|---|---|---|---|---|---|---|---|---|---|---|---|---|
| SBR 2101 | 43 | FRA | ND | OHP | FA | 60 | | 0.1 | 11.0 | 0.10 | 23.5 | 24 |
| SBR 2111 | 50 | FRA | ND | OHP | Ra | 60 | 52 | 0.10 | 9.5 | 0.10 | 23.5 | 20 |
| SBR 2112 | 50 | FRA | ND | OHP | RA | 60 | 52 | 0.10 | 9.5 | 0.10 | 23.5 | 40 |

[1] U.S. Sieve Series No. 80. Detailed requirements for this sieve are given in the Specifications for Sieves for Testing Purposes (ASTM Designation: E 11), 1961 Book of ASTM Standards, Part 9.

NOTE.—Abbreviations and symbols used in this table are defined as follows: FA=Fatty Acid, FRA=Free Radical Type, ND=Non-discoloring, OHP=Organic Hydro Peroxide, RA=Rosin Acid.

EXAMPLE II

A dispersion of 10,000 ppm SBR 2101 latex solids in fresh water was established with 500 ppm of nonylphenoxypoly(ethyleneoxy)ethanol (Igepal CO-710) nonionic surfactant. The same perforated pipe apparatus described in Example I was again employed. In this case, the invasion rate was reduced from 140 milliliters per minute to 0, while the penetration distance from the seal was about 6 inches.

In neither example was there any deposit of latex within the pipe itself. However, if the raw latex is used without added stabilizing surfactants, the deposition occurs right at the sand-pipe surface with little or no penetration as compared to the results reported hereinabove. Table II included hereinbelow shows the results of several tests made in accordance with the process of our invention. Table II illustrates primarily the preferred embodiment, that being the brine-latex emulsion approach, but also includes an asphaltic emulsion example. The contents of Table II were achieved using a vertically mounted glass tube about 1 inch in diameter and from 4–12 inches long, equipped with retaining screens or fritted glass discs at the bottom end. Each tube was packed about half full of unconsolidated porous media of different grain sizes, ranging from ultra-fine clay-silt mixtures up to very coarse Ottawa sands. A screen was placed at the top of the packs so that the addition of liquid would not disrupt the packing at the upper surface. The unpacked upper half of the tubes provided a liquid head space of 2 to 6 inches high, therein providing the maximum pressure used to inject the particle emulsions.

The single asphalt emulsion was a special preparation with a maximum particle size of about 6 microns. This emulsion as applied contained 2500 ppm of mixed nonionic surfactants introduced during its manufacture. The results as obtained with the asphalt emulsion as shown in Table II only further indicate that the preferred embodiment of our invention is the surfactant-stabilized, brine-latex emulsion process. Table II and its included results are for illustrative purposes only and should not be considered as limiting upon the scope of the present invention.

TABLE II

| Porous medium (grain size) | Sealant emulsion Type | Solids conc. (p.p.m.) | NaCl conc. (p.p.m.) | Nonionic surfactant sealant | Nominal water permeability (darcys) Before | After | Latex penetration (in.) |
|---|---|---|---|---|---|---|---|
| Clay-Silt (ultrafine) <1.0 microns | SBR 2111, 2112 | 40,000 | Nil | 4,000 | 0.01 | Nil | 1.5 |
|  |  | 40,000 | Nil | Nil | 0.01 | Nil | 0.1 |
|  |  | 20,000 | Nil | 4,000 | 0.01 | 0.002 | 3.0 |
| Barnsdall Sand (fine) <3 microns | SBR 2111, 2112 | 40,000 | Nil | 4,000 | 0.50 | 0.01 | 4.0 |
|  | SBR 2101 | 20,000 | 10,000 | Nil | 0.50 | Nil | 0.25 |
| Mill Creek Sand (medium) <5 microns | SBR 2111, 2112 | 40,000 | Nil | 4,000 | 10 | 2 | 6.0 |
|  | SBR 2101 | 20,000 | 10,000 | Nil | 10 | 0.01 | 6.0 |
| Ottawa Sand (coarse) <10 microns | SBR 2111, 2112 | 40,000 | Nil | 4,000 | 130 | 10 | 6.0 |
|  | SBR 2101 | 20,000 | 10,000 | Nil | 130 | 0.05 | 6.0 |
|  | SBR 2101 | [1] 20,000 | [1] 20,000 | Nil | 130 | 0.02 | [1] 1.5 |
| Ottawa Sand (coarse) <10 microns | Asphalt | 20,000 | 10,000 | Nil | 130 | 40 | 6.0 |

[1] Unstable in bulk.

The results in Table II above demonstrate an effective water permeability barrier ranging from 0.1 up to 6 inches from the conduit break. These effective results primarily illustrate the application of the preferred embodiment of a surfactant-stabilized, brine-latex emulsion process. Certain modifications of our invention will become apparent to those skilled in the art and the illustrated details disclosed hereinabove are not to be considered as imposing unnecessary limitations on the invention.

What we claim is:

1. A process for the in situ sealing of soil surrounding an opening in an underground conduit, comprising:
   injecting an emulsion into the conduit, said emulsion having water, latex particles of a size in the range of about 0.1 to about 10 microns and a surfactant in an amount sufficient to provide said emulsion with a preselected stability; and
   passing the emulsion through the opening in the conduit and through the surrounding soil in contact therewith for coagulating the emulsion in the soil in response to contact of the emulsion with the soil and adsorbtion of the surfactant by the soil for sealing said soil.

2. A process according to claim 1 wherein the latex particles are selected from the group consisting of styrene/butadiene-rubber and butadiene/rubber.

3. A process, as set forth in claim 1, wherein the emulsion contains brine.

4. A process according to claim 3 wherein the sodium chloride concentration is less than 20,000 ppm.

5. A process according to claim 3 wherein the soil surrounding the underground conduit opening has a grain size of from about 1 to about 10 microns.

6. A process, as set forth in claim 3, wherein the emulsion has a solid concentration of from about 20,000 to about 50,000 ppm.

7. A process, as set forth in claim 1, wherein the surfactant is a non-ionic surfactant.

8. A process, as set forth in claim 1, wherein the surfactant is nonylphenoxypoly(ethyleneoxy)ethanol.

9. A process for the in situ sealing of soil surrounding an opening in an underground conduit, comprising:
   injecting into the conduit a surfactant-stabilized emulsion, said emulsion having brine, latex particles, and surfactant therein, said latex particles being in a size range of about 0.1 to about 10 microns and said surfactant being a non-ionic surfactant of a volume sufficient for providing the emulsion with a preselected stability; and
   passing a volume of the emulsion through the opening in the conduit and through the surrounding soil in contact therewith for coagulating the emulsion in the soil in response to contact of the emulsion with the soil and adsorbtion of the surfactant by the soil for sealing said soil.

10. A process, as set forth in claim 9, wherein the emulsion is a non-ionic surfactant-stabilized, brine-containing latex particles emulsion having a solid concentration from about 20,000 to about 50,000 ppm.

11. A process, as set forth in claim 9, wherein the surfactant is nonylphenoxypoly(ethyleneoxy)ethanol.

12. A process, as set forth in claim 9, wherein the latex particles are selected from the group consisting of styrene/butadiene-rubber and butadiene/rubber.

13. A process, as set forth in claim 9, wherein the sodium chloride concentration is less than 20,000 ppm.

14. A process, as set forth in claim 9, wherein the soil surrounding the underground conduit opening has a grain size in the range of about 1 to about 10 microns.

* * * * *

UNITED STATES PATENT OFFICE
CERTIFICATE OF CORRECTION

Patent No. 3,727,412     Dated April 17, 1973

Inventor(s) John W. Marx et al.

It is certified that error appears in the above-identified patent and that said Letters Patent are hereby corrected as shown below:

On the cover sheet [75] "John W. Marx; Jr. Bowman" should read -- John W. Marx; Mark M. Bowman, Jr. --.

Signed and sealed this 5th day of March 1974.

(SEAL)
Attest:

EDWARD M. FLETCHER, JR.
Attesting Officer

C. MARSHALL DANN
Commissioner of Patents